United States Patent [19]

De Boer et al.

[11] 4,364,097
[45] Dec. 14, 1982

[54] TAPE SPEED CONTROL DEVICE

[75] Inventors: Jacob De Boer; Hendrik J. Sanderson, both of Eindhoven, Netherlands; Friedrich Sommer, Vienna, Austria

[73] Assignee: U.S. Philips Corporation, New York, N.Y.

[21] Appl. No.: 154,643

[22] Filed: May 30, 1980

[30] Foreign Application Priority Data

Jun. 22, 1979 [NL] Netherlands ............... 7904885

[51] Int. Cl.³ .................. G11B 15/18; G11B 21/10
[52] U.S. Cl. ........................... 360/70; 360/73; 360/75; 360/77
[58] Field of Search .............. 360/73, 70, 77, 75, 360/106–109, 84, 85

[56] References Cited

U.S. PATENT DOCUMENTS

| | | | |
|---|---|---|---|
| 3,668,492 | 6/1972 | Ronishi | 360/73 |
| 4,056,832 | 11/1977 | De Boer et al. | 360/77 |
| 4,110,799 | 8/1978 | Bergmons | 360/70 |
| 4,148,082 | 4/1979 | Okada | 360/70 |
| 4,184,181 | 1/1980 | Mijstovic | 360/73 |
| 4,237,500 | 12/1980 | Sanderson | 360/77 |
| 4,297,733 | 10/1981 | Sanderson | 360/77 |

FOREIGN PATENT DOCUMENTS 7702815 9/1978 Netherlands ............... 360/77

*Primary Examiner*—Alan Faber
*Attorney, Agent, or Firm*—Robert S. Smith; Joseph P. Abate

[57] ABSTRACT

A two-head recorder in which information is read from recording tracks which are substantially parallel to each other and which make an angle with the longitudinal axis of a tape-like recording medium. The recorder comprises two heads which are each mounted on a transducer for moving the head as a function of tracking signals for the two heads which appear alternately so that the two heads are alternately centered relative to the recording track. The tracking signals are also applied to a tape speed control circuit in order to control the speed of the tape-like recording medium depending upon the average value of the tracking signals.

4 Claims, 4 Drawing Figures

TAPE SPEED CONTROL DEVICE

BACKGROUND OF THE INVENTION

The invention relates to an apparatus for reading information from recording tracks which extend substantially parallel to each other and make an angle with the longitudinal axis of a recording tape. The apparatus includes at least a first and second head for in turn sequentially reading consecutive recording tracks, at least a first and a second transducer for adjusting the position of respectively the first and the second head in a direction transverse to the direction of the recording tracks, a tracking signal generator for alternately generating at least a first and a second tracking signal respectively, which signal is a measure of the deviation of the first or the second head relative to the center of the track to be followed by said head, an energizing circuit for energizing the first and the second transducer as a function of the first and the second tracking signal respectively, so as to center the first and the second head respectively relative to the track to be followed by said head, and a tape speed control circuit.

Such an apparatus is a two-head version of the apparatus disclosed in U.S. Pat. No. 4,297,733, issued Oct. 27, 1981, corresponding to Netherlands Patent application No. 7,702,815 which has been laid open to public inspection. In such a two-head apparatus, tracking signals can be generated which alternately center the first and the second head relative to the track to be followed. In addition to a control for the head positions, such an apparatus also requires a tape speed control. It is known to control the tape speed by comparing a signal obtained from a tacho-generator which is coupled to a tape-drive motor with a synchronizing signal which is recorded on the tape. This has the drawback that a separate synchronizing track is required on the tape.

SUMMARY OF THE INVENTION

It is the object of the invention to provide a two-head apparatus having a tape speed control which does not require a separate synchronizing signal. The invention is characterized in that the tape speed control circuit comprises a first input to which alternately and consecutively the first and second tracking signals are applied in order to control the transport speed of the recording medium in the form of a tape so that the average value of the tracking signals is maintained at a constant reference value.

The invention is based on the recognition that when the tape speed in a two-head apparatus deviates from the desired speed the two heads are controlled in the same direction so that they each keep following the desired track. Therefore, the two tracking signals will change in the same sense as a result of which the average value of the two tracking signals will deviate from a value at the correct tape speed. This deviation may be used as a control signal for the tape speed control. It is obvious that this tape speed control may also be used if more than two heads and thus more than two alternately occurring tracking signals are employed.

Head position control with the aid of the tracking signals is a comparatively fast control. However, the tape speed control may be substantially slower. It is therefore advantageous that the tape speed control circuit comprises a comparator for comparing the signal appearing on the first input with a reference value and generating a constant signal of a first polarity on an output of said comparator when the signal on the first input is greater than said reference value and a constant signal of a second polarity, opposite to the first polarity, when the signal on said first input is smaller than the reference value, and an integrator for integrating the signal on the output of the comparator.

Such a control is a so-called two-point control. It may occur that the two heads are controlled apart so that the average value of the two tracking signals individually are far apart and a symmetrical square wave signal appears on the output of the comparator. In this case, the output signal of the integrator becomes independent of variations in tape speed in a certain range. In order to maintain tape speed control in this case, a preferred embodiment of an apparatus in accordance with the invention is characterized in that the tape speed control circuit further comprises a circuit for applying a signal which is proportional to the signal on the first input to the integrator.

This preferred embodiment may further be characterized in that the tpe speed control circuit further comprises an amplifier having a first input connected to the integrator, a second input, and an output connected to a motor for driving the recording medium in the form of a tape, to which motor a tachogenerator is coupled which supplies a signal proportional to the speed of the motor, which signal is applied to the second input of the amplifier.

BRIEF DESCRIPTION OF THE DRAWING

The invention will be described in more detail with reference to the drawing, in which.

DESCRIPTION OF THE PREFERRED EMBODIMENTS

FIG. 1A schematically represents the sequence of tracking signals with, in this order, the frequencies $f_1$, $f_2$, $f_3$ and $f_4$ on a tape T. A head 1 reads these frequencies and these frequencies are mixed with a signal of the frequency $f0$. FIG. 1B represents the variation of a control signal S which is produced when a head 1, which should follow a track with a tracking frequency $f_2$, (the mixing frequency $f0$ being selected in conformity therewith), is moved along the tape T in the direction P transverse to the track direction.

Figure 1:
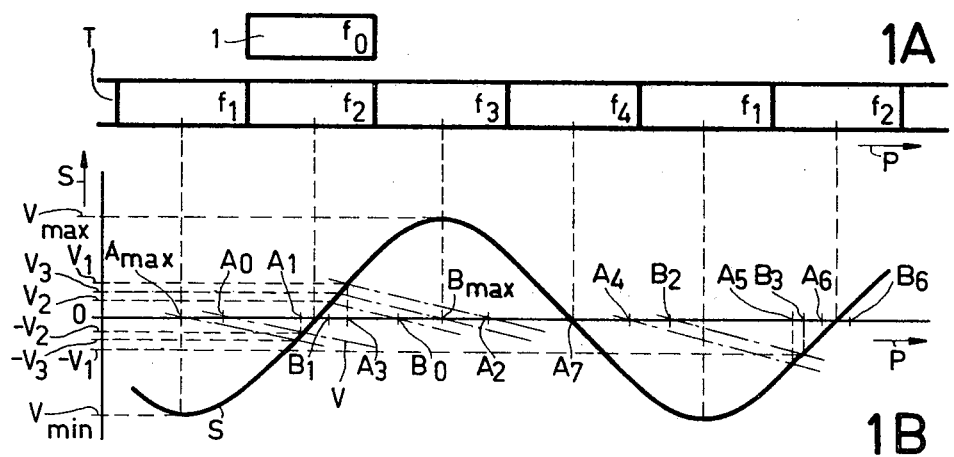
FIG. 1A is a schematic representation of the sequence of tracking signals on a tape.
FIG. 1B represents the variation of a control signal as a function of the track being read.
Figure 2:
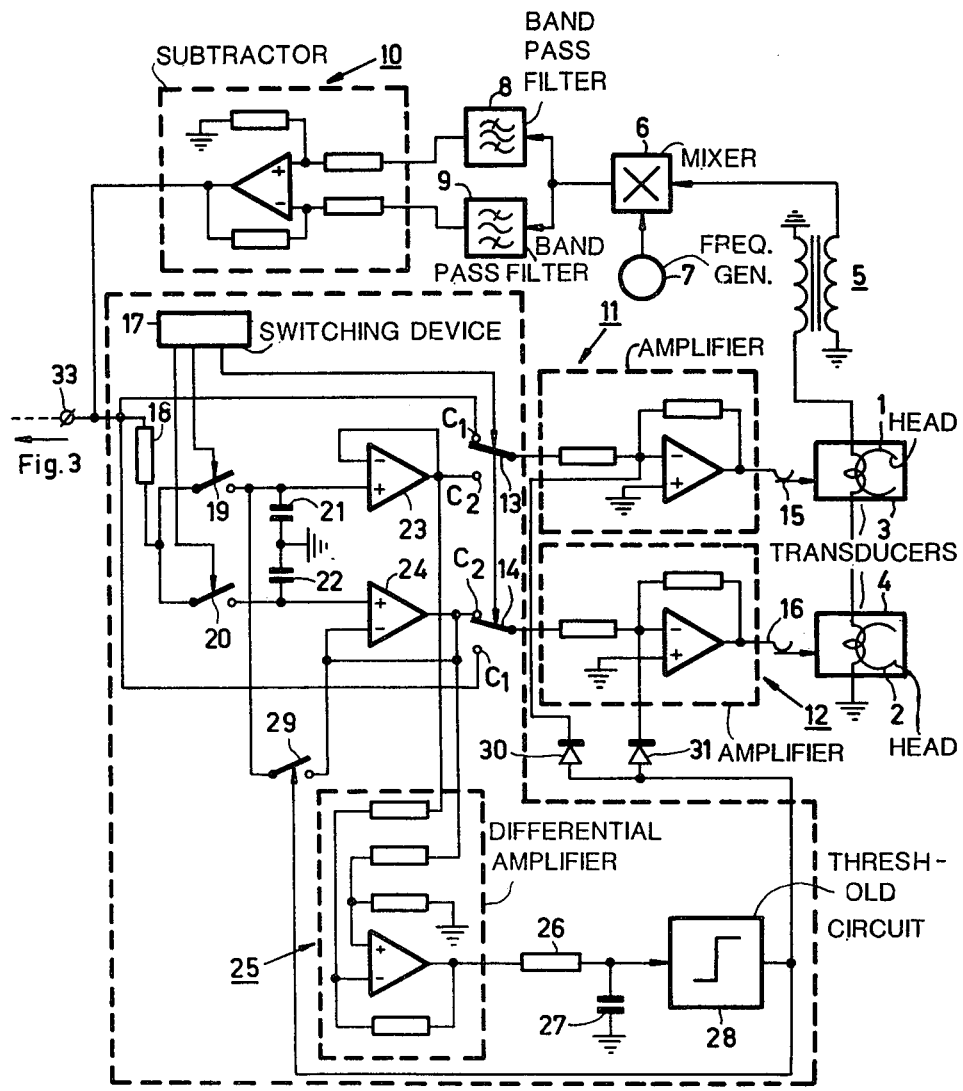
FIG. 2 is a schematic circuit diagram of a preferred embodiment of a device to which the invention may be applied.

FIG. 2 shows the circuit diagram of a tracking device. The heads 1 and 2 are respectively mounted on a transducer 3 and 4 for respectively adjusting the height of the heads 1 and 2. The read coils of the heads 1 and 2 are connected in series and via, for example, a rotary transformer 5 connected to the input of a mixing stage 6 which also receives the output signal of a frequency generator 7. The frequency $f0$ of this signal changes after every track so that a mixing frequency always corresponding to the track to be read is applied. Two specific mixing products are extracted from the output signal with the bandpass filters 8 and 9. By means of an operational amplifier 10 connected as a subtracting circuit, the difference of these mixing products is determined. This difference is the signal S shown in FIG. 1B.

If head 1 should follow the track with a tracking frequency f2, frequency generator 7 will generate a frequency F0 which, with the frequency f1 or f3 of the left-hand or right-hand adjacent tracks respectively, yields a mixing product which is recovered by the bandpass filter 8 or 9. If the head 1 exactly follows said track with a tracking frequency f2, the mixing products are equal in amplitude and the signal S has a value 0 V. If the head 1 follows the track with the tracking frequency f1, the mixing product of the frequency f1 and the frequency f0 is a maximum and the signal S has a minimum value $V_{min}$. If the head 1 follows the track with a tracking frequency f3, the mixing product of frequency f3 and the frequency f0 is a maximum and the signal S has a maximum value $V_{max}$. If the head 1 follows a track with a tracking frequency f4, the mixing products of the frequencies f1 and f3 with the frequency f0 are equal in amplitude and the signal S has the value 0 V. This yields the discrimination characteristic of FIG. 1B for the value of the signal S as a function of the head position P.

After head 1 has read the track with the tracking signal of a frequency f2, head 2 should read the next track with tracking signal of frequency f3. The frequency f0 then changes so that the mixing product of the frequency f2 or f4 is transmitted by bandpass filter 9 or 8 respectively. A similar discrimination characteristic is then valid but shifted by one track distance in the direction P. The characteristic shown in FIG. 1B applies to each of the two heads 1 and 2, the track with the tracking signal of the frequency f2 being the track to be followed.

In order to make the heads 1 and 2 follow the desired tracks, the signal S which appears amplified on the output of amplifier 10 is applied to the transducers 3 and 4 associated with said heads. Only that head 1 or 2 which is instantaneously reading is controlled in height as a function of the signal S at that instant. For this purpose, the device comprises a change-over switch 13 which connects the output of amplifier 10 to the input of amplifier 11 when head 1 is reading and a change-over switch 14 connects the output of amplifier 10 to the input of an amplifier 12 when head 2 is reading. The output of amplifier 11 or 12 is connected to transducer 3 or 4 respectively via, for example, a slip ring 15 and 16 respectively. Regarding signal polarities, the entire circuit is dimensioned such that, in the case of a negative signal S, the relevant head is controlled to the left and, in the case of a positive signal S, to the right. The switches 13 and 14 are actuated by a device 17, in synchronism with the movements of the heads 1 and 2, so that the amplified signal S is always applied to the correct transducer.

FIG. 1B shows the positions $A_o$ and $B_0$ of the heads 1 and 2 respectively in the uncontrolled condition relative to the discrimination characteristic. As a result of hysteresis and mechanical tolerances these positions will not be identical. The average positions of heads 1 and 2, however, are situated on the center of the track to be followed due to the tape speed servo mechanism shown in FIG. 3. By means of the tracking mechanism, head 1 is moved to the right along the line of action V in FIG. 1B and head 2 to the left along a similar line of action. The line V represents the position of the head 1 as a function of the voltage on the input of amplifier 11, while the characteristic S represents the input voltage as a function of the head position. The heads will then be adjusted to the intersection of the associated line of action and the characteristic S. In FIG. 1B, these are the positions $A_1$ and $B_1$ which respectively correspond to the values $V_2$ and $+V_2$ of the signal S.

The head positions $A_1$ and $B_1$ are disposed symmetrically relative to that position at which the signal S has the value 0 V, because the initial positions AO and BO were disposed symmetrically. If this were not the case, said positions $A_1$ and $B_1$ would not have been symmetrical initially. However, the tape speed servo mechanism corrects this by controlling the tape speed until the average position of the heads 1 and 2 is situated on the zero point of the characteristic S.

When a track is being scanned each time by one of the heads 1 and 2, said head is always substantially centered on the track. When the tape speed and the head speed are sufficiently constant, the position of said head at the beginning of the track will be in conformity with the position occupied by the head at the beginning of the previous track followed by said head rather than with the position occupied by said head at the end of this previous track. Therefore, it is favorable to control said head to the same position as occupied by the head at the beginning of the last track read in that half revolution period of the head disc in which the relevant head is not reading and is consequently not controlled in height.

For this purpose, the output of amplifier 10 is connected to capacitor 21 via a charging resistor 18 and a switch 19, and to capacitor 22 via the charging resistor and the switch 20. The switches 19 and 20 are briefly short-circuited on command of the device 17 at the start of a scan of the track by the head 1 or 2 respectively, so that the voltage across capacitor 21 or 22 corresponds to the value of the signal S at the beginning of the scan of a track by head 1 or 2 respectively. This voltage across capacitor 21 or 22 is applied to contact $C_2$ of switch 13 or 14 via an operational amplifier 23 or 24 respectively, which is connected as a follower. The switch 13 or 14 makes contact with said contact $C_2$ when head 1 or 2 respectively is not reading during a half revolution of the head discs. As a result, the heads 1 and 2 are moved to a position corresponding to the position of these heads at the beginning of the preceding read period during "flyback", which is the period during which these heads alternately are not reading.

With the present tracking system, it may happen that the heads exhibit a mutual difference in height corresponding to four tracks or a multiple of four tracks. These situations are stable and may, for example, arise as a result of incorrect locking-in at the beginning of playback. FIG. 1B shows a situation in which the uncontrolled positions A2 and B2 of head 1 and 2 respectively are symmetrical relative to the track with the tracking signal of the frequency f4. The discrimination characteristics S, because the frequency f0 of the frequency genrator 7 does not correspond to the actual situation, corresponds to a track to be followed with a tracking signal of a frequency f2. As the value of the signal S corresponding to position A2 or B2 is positive or negative respectively, head 1 is controlled to the left and head 2 to the right. The heads 1 and 2 are consequently controlled to position A3 and B3 respectively, which positions are substantially four tracks apart and are stable. For the positions A3 and B3, the signal S has a value V1 and −V1 respectively.

FIG. 1B shows that when the mutual deviation of the heads 1 and 2 in the uncontrolled condition as a result of hysteresis and mechanical tolerances is less than two tracks, i.e. if the positions Ao and Bo are at any rate situated between the positions Amax and Bmax, the voltage V1 is always greater than the voltage V2. Indeed, the voltage V3=(V1+V2) is produced when head 1 is corrected starting from position Amax. Therefore, when position A0 is always situated within position Amax, the voltage V2 will always be smaller than the voltage V3, while the voltage V1 will always be greater than the voltage V3.

In situations where the initial positions, A0, B0 and A2, B2 respectively are not situated symmetrically, the difference of the values of the signal S corresponding to the controlled positions of the heads 1 and 2 for correct positions is always greater than said difference in the case of a mutual error of four tracks or a multiple of four tracks if the relative starting positions are less than two tracks apart. The tracking method in accordance with the invention utilizes this datum. In a selected embodiment, the value of the signal S at the beginning of the scan of a track by head 1 or 2 appears on capacitor 21 or 22 respectively. In order to determine this difference in value of the signal S, effective use can be made of this initial value. For this purpose, the outputs of followers 23 and 24 in FIG. 2 are connected to inputs of a differential amplifier 25. The output of this differential amplifier thus carries a signal whose value corresponds to the difference between the initial values of the signal S. This output signal is delayed by an RC network 26, 27 and applied to a threshold circuit 28 having a threshold corresponding to the value 2V3.

The undesired situation with the heads 1 and 2 at positions A3 and B3 can be resolved by applying to the transducer of one of the heads the voltage applied to the transducer of the other head. In the example described with reference to FIG. 1B, the voltage applied to the transducer of head 2 is applied to the transducer of head 1. As a result, head 1 moves from position A3 to position A4, which position, when hysteresis effects are ignored, is situated at the same distance to the right of the initial position A2 as the head 2 is situated to the right of B2 and, subject to the condition imposed, this is at less than two tracks from the position B3 of head 2. The tracking mechanism then moves head 1 from position A4 along the line of action to the right, up to position A5. The two heads 1 and 2 are then situated to the left of the track with the tracking frequency f2. By changing the tape speed, the tape speed servo mechanism will control the average position of the heads 1 and 2 symmetrically relative to the track, so that ultimately the positions A6 and B6 are reached, which is again a stable situation.

In the embodiment of FIG. 2, the foregoing is achieved in that a switch 29 is included between the output of the follower 24 and capacitor 21. The switch is actuated by the output signal of threshold circuit 28 and is closed when the input signal of threshold 28 exceeds the specified level 2V3.

By closing of switch 29, capacitor 21 is charged to the same voltage as capacitor 22 so that, during the flyback of head 1, head 1 is moved to position A4 by transducer 3, after which, during read-out of the next track by head 1, said head is moved to position A5 and simultaneously but more slowly to position A6 by the tape servo mechanism.

After switch 28 has been closed, the output signal of the differential amplifier 25 will become OV. This is below the threshold 2V3 of threshold circuit 28, so that switch 29 opens again. RC-network 26, 27 delays the output signal of differential amplifier 25 in order to prevent switch 29 from opening prematurely after switch 29 has been closed on command of the threshold circuit 28.

As stated previously, hysteresis plays a part in the displacement of head 1 from position A3 to position A4. Thus due to hysteresis, head 1 could be moved from position A3 to a position to the left of the position designated A7 in FIG. 1B, after which the tracking mechanism would return head 1 to the left, result in an unstable situation. A solution is obtained by subjecting the two heads to substantially the same hysteresis by fully driving the transducers 4 and 3 to one direction upon detection of a deviation in their mutual positions. In the embodiment of FIG. 2 this is effected by bringing the inputs of amplifiers 11 and 12 to a high level by connecting the output of threshold circuit 28 to the input of the amplifier 11 or 12 respectively via diodes 30 and 31 respectively. Diodes 30 and 31 isolate the output of threshold circuit 28 from the amplifiers 11 and 12 in the desired situation in which the output voltage of threshold circuit 28 is low.

This method of avoiding adverse effects as a result of hysteresis, though satisfactory in practice, is not an optimum. Indeed, at the instant that the transducers 3 and 4 are fully driven to one direction, it may happen that head 2 is reading; switch 13 being in the position shown. Transducer 3 then does not receive the same control voltage as transducer 4 received half a revolution of the head disc previously, until both transducers have been driven and is then still subject to a hysteresis which is no longer corrected. A solution for this problem is not to apply the drive pulse to transducer 3 until switch 13 has changed over and makes contact with contact $C_2$.

Figure 3:
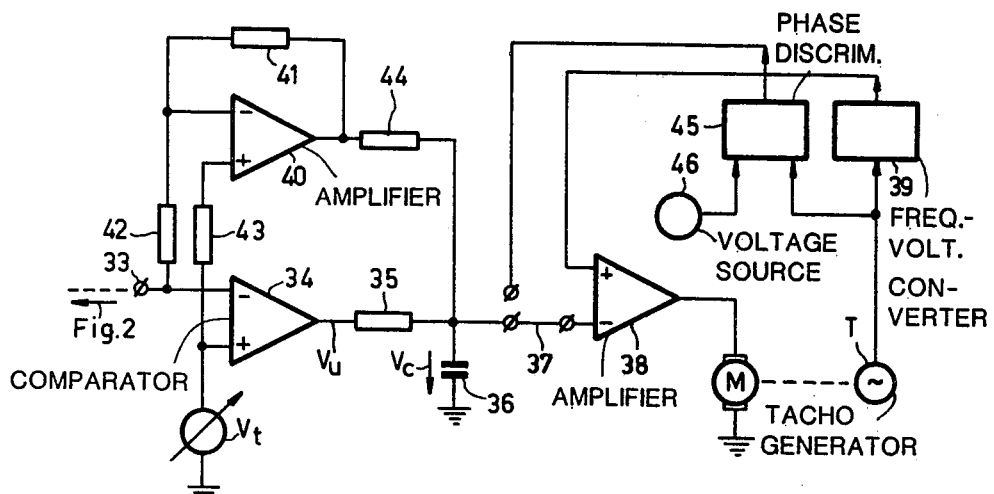
FIG. 3 is a schematic circuit diagram of a tape speed control circuit in an apparatus in accordance with the invention, which may be used in conjunction with the device of FIG. 2.

FIG. 3 shows an embodiment of a tape servo control in accordance with the invention used in conjunction with the head-height control in accordance with FIG. 2. The tape servo control circuit has an input 33 which is connected to the output of amplifier 10 in the circuit of FIG. 2. On input 33, consequently, the control signal S, derived from the tracking signals which are alternately read by the heads 1 and 2, is available. Input 33 is connected to the inverting input (−) of a comparator 34—in the present example an operational amplifier with a very high gain factor and without negative feedback—whose non-inverting input (+) is connected to a source of reference voltage $V_t$ which may be variable. The output voltage $V_u$ of comparator 34 is consequently low when the signal S is greater than the reference voltage $V_t$ and high when the signal S is smaller than the reference voltage $V_t$.

The output of comparator 34 is connected to a capacitor 36 via resistor 35. Resistor 35 ensures that capacitor 36, depending upon the level of the output voltage of comparator 34, is charged or discharged with a substantially constant current. Instead of a driven voltage amplifier with a charging resistor, it is also possible to use a charging and a discharging current source which is switched by the output voltage of a comparator.

Via switch 37, which during playback is in the position shown, capacitor 36 is connected to the inverting input (−) of an amplifier 38 whose output voltage is applied to the tape drive motor M.

To the drive motor M, a tacho-generator T is coupled whose output signal, in the present example a signal of a frequency proportional to the speed of the motor M, is applied to a frequency-voltage converter 39. The output voltage of said frequency-voltage of said frequency-voltage converter 39 is applied to the non-inverting input (−) of the amplifier 38.

The loop including tacho-generator T, frequency-voltage converter 39, amplifier 38 and motor M stabilizes the speed of the motor M at a nominal value. A signal on the inverting input of amplifier 38 corrects said nominal speed as a function of the signal on said inverting input.

Figure 4:
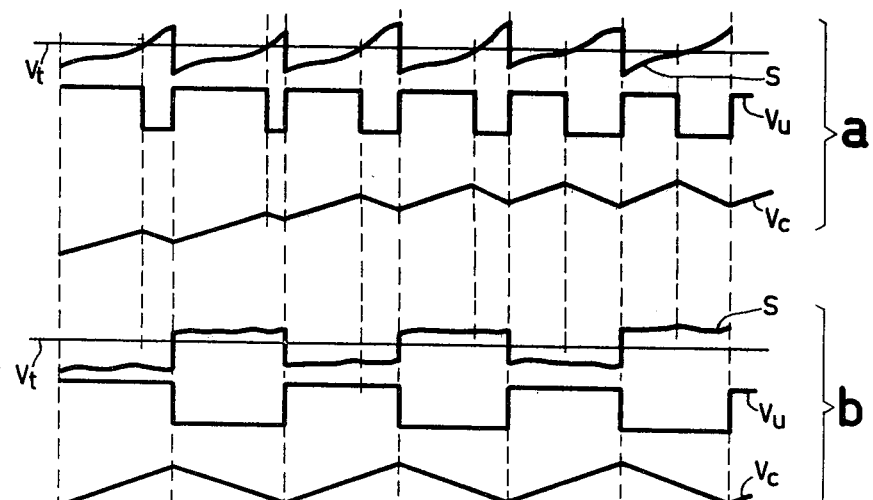
FIG. 4 is a graphical representation of signal waveforms which illustrate the operation of the circuit arrangement of FIG. 3.

FIG. 4a shows an example of the signal S consisting of portions which are derived from the tracking signal alternately read by head 1 and head 2 (FIG. 2) and which are alternately applied to the transducers 3 and 4 in the manner previously discussed with reference to FIG. 2. That is the output voltage $V_u$ of comparator 34 is obtained by comparison of the signal S with the reference voltage $V_t$, and the voltage $V_c$ across capacitor 36 is obtained by charging or discharging capacitor 36 with a current which is determined by said voltage $V_u$ and the value of the resistor 35. If the average level of the signal S does not coincide with the reference voltage $V_t$, the average level of the voltage $V_c$ across capacitor 36 will change and thus the speed of the motor M will change until the average level of the signal S coincides with the reference voltage $V_t$. The reference voltage $V_t$ is then adjusted so that, in this case, the positions of the two heads 1 and 2 are situated symmetrically relative to the zero points of the characteristic shown in FIG. 1B.

It may happen, for example, after the situation of incorrect locking-in discussed with reference to FIGS. 1 and 2 or, for example, due to an incorrect head-position control, that one of the two transducers 3 and 4 surpasses a drive range so that the average levels of the two portions of the signal S are so far apart that the one portion is always smaller than the reference voltage $V_t$ and the other portion is always greater than the reference voltage $V_t$. FIG. 4B shows such a signal S. The corresponding output signal $V_u$ of comparator 34 is then a square wave having a pulse width of 50%. The result of this is that the average voltage across capacitor 36 does not change and the motor does not change although the average level of the signal S deviates from the reference voltage $V_t$.

In order to maintain tape speed control in such event, the circuit of FIG. 3 comprises an amplifier 40 with a feedback resistor 41 and input resistors 42 and 43. The values of said resistors 41, 42 and 43 determine the gain factor of the amplifier 40. The inverting input (−) is connected to the signal input 33 via the resistor 42 and the non-inverting input (+) is connected to the reference voltage $V_t$ via resistor 43. The output of amplifier 40 is connected to capacitor 36 via resistor 44. Thus, a current which is proportional to the signal S is applied to capacitor 36, such that capacitor 36 is charged or discharged until the average level of the signal S coincides with the reference voltage $V_t$. In this way, a tape speed control is obtained upon the occurrence of a signal S as shown in FIG. 4b. However, this control is substantially slower than the tape speed control in the situation illustrated in FIG. 4a. The control circuit shown in FIG. 3 is a so-called two-point control in parallel with a proportional control.

The circuit of FIG. 3 further comprises a phase discriminator 45 which compares the phase of the signal from the tacho-generator with the phase of a reference signal obtained from source 46. During recording, when the switch 37 is in the position not shown, source 46 applies a control voltage which corresponds to the phase difference between said reference signal and the tacho-signal to the inverting input (−) of amplifier 38, so that during recording the speed of the motor M is accurately determined by the reference signal from source 46.

What is claimed is:

1. An apparatus for reading information from two recording tracks which extend substantially parallel to each other and make an angle with the longitudinal axis of a recording medium in the form of a tape, comprising at least a first and a second head for in turn sequentially reading consecutive recording tracks, at least a first and a second transducer for adjusting the position of the first and the second head respectively in a direction transverse to the direction of the recording tracks, a tracking signal generator for alternately generating at least a first and a second tracking signal respectively, which is a measure of the deviation of the first or the second head relative to the center of the track to be followed by said head, an energizing circuit for energizing the first and the second transducer as a function of the first and the second tracking signal respectively, so as to center the first and the second head relative to the track to be followed by said head, and a tape speed control circuit, characterized in that the tape speed control circuit comprises a first input to which alternately and consecutively the first and second tracking signals which occur are applied in order to control the speed of transport of the recording medium, such that the average value of the tracking signals is maintained at a constant reference value.

2. An apparatus as claimed in claim 1, characterized in that the tape speed control circuit comprises a comparator for comparing the signal appearing on the first input with a reference value and generating on an output of said comparator a constant signal of a first polarity when the signal on the first input is greater than said reference value and a constant signal of a second polarity, opposite to the first polarity, when the signal on said first input is smaller than the reference value; and an integrator for integrating the signal on the output of the comparator.

3. An apparatus as claimed in claim 2, characterized in that the tape speed control circuit further comprises a circuit for applying a signal which is proportional to the signal on said first input to the integrator.

4. An apparatus as claimed in claim 3, characterized in that the tape speed control circuit further comprises an amplifier having a first input connected to the integrator, a second input, and an output connected to a motor for driving the recording medium in the form of a tape; and the apparatus further comprises a tacho-generator coupled to said motor, which generator supplies a signal which is proportional to the speed of said motor, which signal is applied to the second input of said amplifier.

* * * * *